United States Patent
Rosin et al.

[15] 3,668,231
[45] June 6, 1972

[54] PRODUCTION OF CYANOACETIC ACID
[72] Inventors: Jacob Rosin, Maplewood; Frank S. Ang, Kearney, both of N.J.
[73] Assignee: Chris-Craft Industries, Inc.
[22] Filed: Sept. 9, 1970
[21] Appl. No.: 70,915

Related U.S. Application Data

[63] Continuation-in-part of Ser. No. 749,940, Aug. 5, 1968, abandoned.

[52] U.S. Cl. ........................................................260/465.4
[51] Int. Cl. ....................................................C07c 121/40
[58] Field of Search ..............................260/465.4; 749/940

[56] References Cited

UNITED STATES PATENTS 2,480,380   8/1949   Nicholl et al. .......................260/465.4
3,375,268   3/1968   Kesslin et al. .......................260/465.4

Primary Examiner—Joseph P. Brust
Attorney—Pennie, Edmonds, Morton, Taylor and Adams

[57] ABSTRACT

Cyanoacetic acid is produced in a sequence of reactions in which an aqueous solution of chloroacetic acid neutralized with sodium carbonate or sodium hydroxide to form sodium chloroacetate which, in turn, is reacted in a nucleophilic substitution with an alkali metal cyanide and the resultant cyanoacetate is then acidified to form an aqueous reaction mixture comprising cyanoacetic acid and the respective salts formed in such reaction sequence. This process is improved
 a. by conducting the nucleophilic substitution reaction in the presence of an alkanol and at a temperature in excess of about 80° C. to accelerate the reaction while substantially precluding undesirable side reactions, thereby increasing the yield of the cyanoacetate and decreasing the tendency of the reaction to form color bodies; and
 b. by extracting the acidified, aqueous reaction mixture with an alkanol which contains from not less than three to about 12 carbon atoms and which is substantially insoluble in saturated brine, using the aqueous reaction mixture in such a manner that the amount of salts in such reaction mixture substantially saturate the amount of water present, thereby permitting substantially all of the cyanoacetic acid to be extracted by the alkanol.

By using these improvements in a process to produce cyanoacetic acid, it is possible to obtain extremely high yields of cyanoacetic acid using much less process equipment than presently employed to produce this product. The improved process furthermore facilitates the subsequent production of alkyl cyanoacetates and of cyanoacetamide.

3 Claims, No Drawings

3,668,231

PRODUCTION OF CYANOACETIC ACID

Cross-Reference to Related Application

This application is a continuation-in-part of copending application Ser. No. 749,940, filed Aug. 5, 1968, and now abandoned.

Prior Art Difficulties

This application relates to an improved process for producing cyanoacetic acid and certain of its derivatives, namely alkyl cyanoacetates and cyanoacetamide.

Cyanoacetic acid is produced in a sequence of reactions in which an aqueous solution of chloroacetic acid is neutralized with sodium carbonate or sodium hydroxide to form sodium chloroacetate which, in turn, is reacted in a nucleophilic substitution with an alkali metal cyanide and the resultant cyanoacetate is then acidified to form an aqueous reaction mixture comprising cyanoacetic acid and the respective salts formed in such reaction sequence. All of the known processes for manufacturing cyanoacetic acid have two major disadvantages. The first of which is that the reaction between sodium cyanide and sodium chloroacetate is very difficult to control and is accomplished by side reactions which result in the formation of color bodies and other impurities as well as in the evolution of some hydrogen cyanide. The second major disadvantage resides in the difficulties encountered in the isolation and work-up of cyanoacetic acid, primarily because cyanoacetic acid is extremely soluble in water. At present, most processes for producing cyanoacetic acid require either evaporation to dryness with the concomitant difficulties in handling such solid resides or they employ extractions with costly and somewhat unstable solvents, or they employ a combination of both techniques as described in British Pat. No. 824,640. The present improvements obviate all of these difficulties.

Statement of Invention

Two basic improvements have been made to the reaction sequence in which an aqueous solution of chloroacetic acid is neutralized with sodium carbonate or sodium hydroxide to form sodium chloroacetate which, in turn, is reacted in a nucleophilic substitution with an alkali metal cyanide and the resultant cyanoacetate is then acidified to form an aqueous reaction mixture comprising cyanoacetic acid and the respective salts formed in such reaction sequence.

Firstly, by conducting the nucleophilic substitution reaction in the presence of an alkanol and at a temperature in excess of about 80° C., it is possible to accelerate the reaction, thereby increasing the yield of the cyanoacetate and decreasing the tendency of the reaction to form color bodies; and Secondly, by extracting the acidified, aqueous reaction mixture with an alkanol which contains from not less than three to about 12 carbon atoms and which is substantially insoluble in saturated brine, using the aqueous reaction mixture in such a manner that the amount of salts in such reaction mixture substantially saturate the amount of water present, it is possible to permit substantially all of the cyanoacetic acid to be extracted by the alkanol, from which it may be easily recovered or used directly to form alkyl cyanoacetates which, in turn, may be used to produce cyanoacetamide.

Based on these discoveries, the invention contemplates the improvement in a process for the production of cyanoacetic acid, in which an aqueous solution of chloroacetic acid is neutralized with sodium carbonate or sodium hydroxide to form sodium chloroacetate which, in turn, is reacted in a nucleophilic substitution with an alkali metal cyanide and the resultant cyanoacetate is then acidified to form an aqueous reaction mixture comprising cyanoacetic acid and the respective salts formed in such reaction sequence, which comprises a. conducting the nucleophilic substitution reaction in the presence of an alkanol and at a temperature in excess of about 80° C. to accelerate the reaction while substantially precluding undesirable side reactions, thereby increasing the yield of the cyanoacetate and decreasing the tendency of the reaction to form color bodies; and b. extracting the acidified, aqueous reaction mixture with an alkanol which contain from not less than three to about 12 carbon atoms and which is substantially insoluble in saturated brine, using the aqueous reaction mixture in such a manner that the amount of salts in such reaction mixture substantially saturate the amount of water present, thereby permitting substantially all of the cyanoacetic acid to be extracted by the alkanol.

Each of these process improvements may be used separately or in combination with each other. Moreover, it is possible to produce alkyl cyanoacetates directly from the alkanol extract of cyanoacetic acid from which alkyl cyanoacetate it is convenient to produce cyanacetamide by ammoniation. Consequently, these process improvements permit the production of high purity cyanoacetamide in very high yields with minimum process equipment.

Basic Parameters of the Process

Basically, the process for producing cyanoacetic acid in accordance with the invention comprises (1) neutralizing chloroacetic acid with sodium carbonate or sodium hydroxide (or both), (2) controlling the nucleophilic substitution reaction of sodium chloroacetate and an alkali metal cyanide by conducting that reaction in the presence of an alkanol, and (3) extracting the resultant cyanoacetic acid with an alkanol. The basic parameters of the process are as follows:

Neutralization of Chloroacetic Acid

To avoid the formation of hydrogen cyanide, the aqueous solution of chloroacetic acid should be partially neutralized with sodium carbonate so that the pH is in the range from 4 to 5. After such partial neutralization a vacuum (from 20–80 mm. Hg.) is drawn on the partially neutralized mixture to remove substantially all of the residual carbon dioxide from the mixture, following which the neutralization is completed with sodium hydroxide. Alternatively, sodium hydroxide can be used exclusively as the neutralizing agent.

Control of Nucleophilic Substitution

The nucleophilic substitution of sodium chloroacetate with sodium cyanide (or potassium cyanide) must be conducted in the presence of an alkanol and at a temperature in excess of about 80° C. to accelerate this reaction while substantially avoiding or precluding undesirable side reactions. Any alkanol may be used for this control, although best results have been obtained by using n-butanol. Since such temperatures result in rapid completion of the nucleophilic substitution, the reaction mixture should be quenched to about 60° C. after about 15 minutes or so, thereby protecting the end-product from degradation. Suprisingly, the use of an alkanol decreases the tendency of the reaction to form by-products or color bodies. Among the other alkanols which may be used are methanol, ethanol, propanol, the amyl alcohols as well as higher alkanols containing up to about 12 carbon atoms.

Extraction of Cyanoacetic Acid

Following the completion of the nucleophilic substitution reaction, the resultant aqueous reaction mixture is acidified to liberate cyanoacetic acid. By extracting the acidified aqueous reaction mixture with an alkanol which contains from not less than three to about 12 carbon atoms and which is substantially insoluble in saturated brine, using the aqueous reaction mixture in such a manner that the amount of salts in such reaction mixture substantially saturate the amount of water present, it is possible to permit substantially all of the cyanoacetic acid to be extracted by the alkanol. The most efficient alkanol for this extraction has been found to be n-butanol. When the nucleophilic reaction between sodium chloroacetate and the alkali metal cyanoamide is conducted in the presence of n-butanol and when this reaction mixture is acidified with an aqueous solution of acid in an amount sufficient to liberate cyanoacetic acid from the sodium cyanoacetate, it has been found that when the concentration of acid used in the acidification of the alkali metal cyanoacetate is such that the resultant salts in the reaction mixture saturate whatever water is present, then the reaction mixture readily separates into two phases namely (1) an alkanol phase containing substantially all of the cyanoacetic acid, and (2) an aqueous phase of saturated brine. Upon separating these two phases from each other, the cyanoacetic acid may be recovered from this reaction in yields previously unobtainable.

Example

A Pfaulder glass-lined reactor was charged with 1,249 lbs. of monochloroacetic acid and 249 gallons of water. The mixture was stirred until solution was achieved and 677 lbs. of sodium carbonate were added gradually. After the sodium carbonate addition was completed, the pressure inside the reactor was lowered to about 20–40 mm. Hg. for about 1.5–2 hours. When the reaction mixture showed a negative $CO_2$ test with $Ba(OH)_2$ the neutralization was completed by the addition of a solution comprising 27.5 lbs. of NaOH in 13 gallons of water.

After the neutralization was complete, the reaction mixture was transferred to a holding vessel from which it is continuously pumped into a 50 gallon reactor at a rate of 1.23 gal./min. while simultaneously pumping into the same reactor 0.796 gal./min. of a solution of 648 lbs. sodium cyanide in 189 gals. water and 0.681 gals./min. of n-butanol. Due to the exothermicity of the reaction, the reaction mixture is always under reflux (temp. about 97° C.) and is 90 percent completed during the 7.5 minutes residence time in the reactor. From the reactor the reaction mixture is alternately flowing into 2,250 gal. finishing vessels kept at 85° C., where the reaction is completed and the reaction mixture flows then into a 2,000 gal. holding vessel kept at about 25° C. From the holding vessel the reaction mixture is continuously pumped into acidifier while simultaneously introducing a corresponding stoichiometric amount 25 percent aq hydrochloric acid. From the acidifier the reaction mixture is continuously pumped into the extraction column, where it is countercurrently extracted by n-butanol. The n-butanol extract is pumped into a holding vessel from which it is transferred to esterification still. The esterification is conducted batchwise by using toluene solfonic acid as catalyst and removing the water azeotropically. After the end of esterification, the excess n-butanol is topped off and the residual butyl cyanoacetate is fed into the amidator as follows: To 215 gals. of butyl cyanoacetate, 79 gals, methanol are added and 405 lbs. ammonia gas are introduced over a period of 4 hours, using cooling to maintain the temperature at 23°–28° C. After the end of the reaction, 79 gals. n-butanol are added to the reaction mixture, methanol is topped off in partial vacuum and the precipitated cyanoacetamide is filtered and dried.

We claim:

1. In a process for the production of cyanoacetic acid, in which an aqueous solution of chloroacetic acid is neutralized with a neutralizing agent selected from the group consisting of sodium carbonate, sodium hydroxide or both to form sodium chloracetate which in turn is reacted in a nucleophilic substitution with an alkali metal cyanide and the resultant cyanoacetate is then acidified to form an aqueous reaction mixture comprising cyanoacetic acid and the respective alkali metal salts formed in such reaction sequence, the improvement which comprises a. conducting the nucleophilic substitution reaction in the presence of an alkanol which contains from not less than three to about 12 carbon atoms and at a temperature from about 80° C. to reflux to accelerate the reaction; and
   b. extracting the acidified, aqueous reaction mixture with an alkanol which contains from not less than three to about 12 carbon atoms and which is substantially insoluble in saturated brine, using the aqueous reaction mixture in such a manner that the amount of alkali metal salts in such reaction mixture substantially saturate the amount of water present, thereby permitting substantially all of the cyanoacetic acid to be extracted by the alkanol.

2. A process for producing cyanoacetic acid according to claim 1, in which (a) the nucleophilic substitution reaction is conducted in the presence of n-butanol, and (b) the acidified, aqueous reaction mixture of cyanoacetic acid is extracted with n-butanol.

3. A process for producing cyanoacetic acid according to claim 1, in which the aqueous solution of chloroacetic acid is neutralized with less than a stoichiometric amount of sodium carbonate achieve a pH in the range from about 4 to about 5, substantially all of the residual carbon dioxide is removed from the partially neutralized mixture under vacuum, and then the neutralization is completed with sodium hydroxide before using the sodium chloroacetate in the nucleophilic substitution reaction.

* * * * *